Oct. 19, 1943.  R. M. NARDONE  2,332,163
ENGINE STARTING MECHANISM
Filed Dec. 17, 1941  2 Sheets-Sheet 1
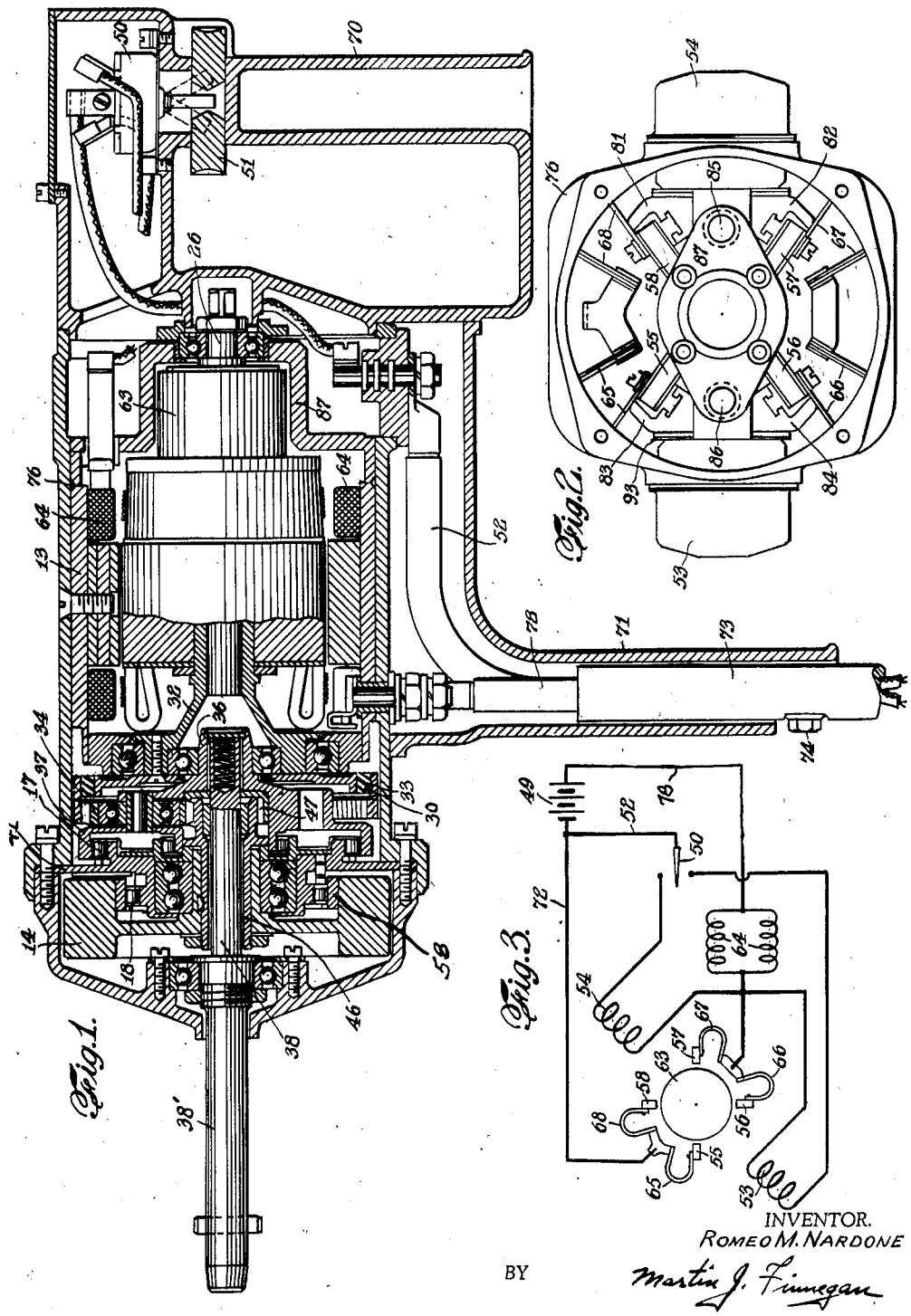
INVENTOR.
ROMEO M. NARDONE
BY
Martin J. Finnegan
ATTORNEY.

Oct. 19, 1943.   R. M. NARDONE   2,332,163
ENGINE STARTING MECHANISM
Filed Dec. 17, 1941    2 Sheets-Sheet 2
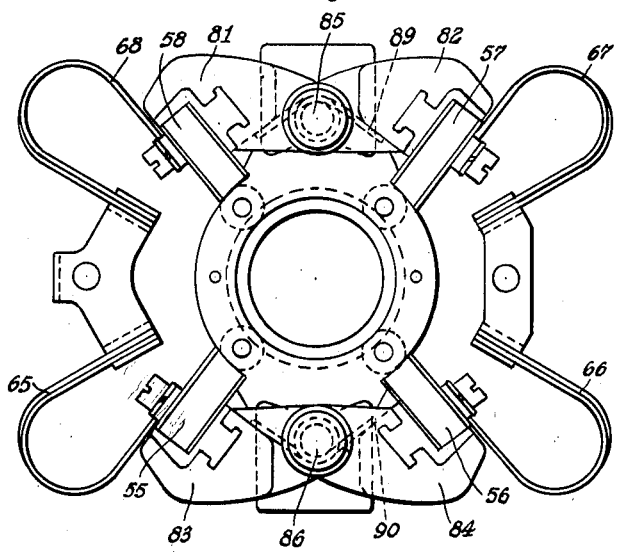
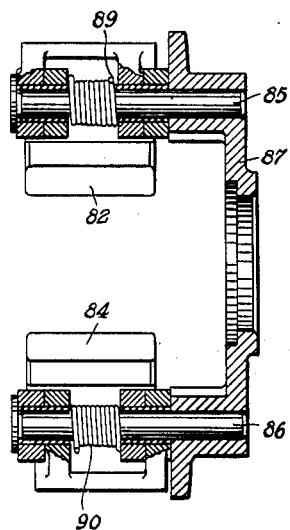
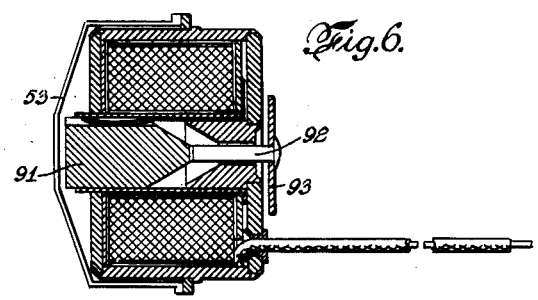
INVENTOR.
ROMEO M. NARDONE
BY Martin J. Finnegan
ATTORNEY.

Patented Oct. 19, 1943

2,332,163

UNITED STATES PATENT OFFICE 2,332,163

ENGINE STARTING MECHANISM

Romeo M. Nardone, Westwood, N. J., assignor to Bendix Aviation Corporation, South Bend, Ind., a corporation of Delaware Application December 17, 1941, Serial No. 423,375

1 Claim. (Cl. 123—179)

This invention relates to engine starting mechanism, and particularly the portable portion of an engine starting mechanism.

An object of the invention is to provide, in a portable starter unit of the motor-driven type, novel means for securing, at the output end of the unit a speed in excess of that of the driving motor.

Another object is to provide, in an inertia type of portable starter, novel means for controlling the acceleration of, and subsequent discharge of energy from, the inertia element.

These and other objects of the invention will become apparent from inspection of the following specification when read with reference to the accompanying drawings wherein is illustrated the preferred embodiment of the invention. It is to be expressly understood, however, that the drawings are for the purpose of illustration only, and are not designed as a definition of the limits of the invention, reference being had to the appended claims for this purpose.

In the drawings:

Fig. 1 is a sectional view of a device embodying the invention;

Fig. 2 is an end view of the brush actuating assembly;

Fig. 3 is a diagram of the electrical connections;

Fig. 4 is a larger view of certain of the parts shown in Fig. 2;

Fig. 5 is a view at right angles to Fig. 4; and

Fig. 6 is a sectional view of one of the two solenoids shown in outline in Fig. 2.

In Fig. 1 the motor 13 (with series field windings 64) is shown as drivably associated with the inertia element 14 by means of driving connections 26 and 32 to a gear train of the planetary type, including an annulus gear 33 and a planet carrier, or "spider," 37 which is held against rotation during operation of the motor in one direction, as in my application No. 419,203, filed November 14, 1941. It is to be understood that elements 26, 32, and 33 (Fig. 1) are integrated with each other in any suitable manner, as are the corresponding elements 26, 32, and 33 of my co-pending application, just referred to.

Likewise, as in my co-pending application, annulus gear 33 meshes with a planetary idler pinion 34 rotatably carried on the "spider" 37, and said spider has a hub 36 keyed to a centrally disposed shaft 38 which is rotatable relatively to the shaft 26—32, and terminates in a threaded socket which receives the correspondingly threaded end of the coupling shaft 38' which coupling shaft 38' has a transverse pin for driving engagement with the end socket (not shown) which projects exteriorly of the outer surface of the aircraft or other vehicle, and serves to transmit the drive to the remainder of the starting mechanism. Surrounding shaft 38 is a sleeve 46 that is keyed to the hub of flywheel 14; said sleeve 46 having teeth 47 which constitute the "sun" gear of the planetary system, of which planetary system the gear elements 33 and 34 are co-operating parts. These gear elements 33, 34, and 47 may be identical in structure and mode of operation to the similarly designated elements 33, 34 and 47 of my co-pending application No. 419,-203, above referred to; but, as shown, gear 33 is in two parts, with rubber material 30 interposed therebetween, as in Waseige Patent No. 1,946,956.

Secured to the housing is a stationary element 41 in the form of an annular plate with projecting ledges which constitute, in effect, the inner races of overrunning clutch assemblies whose rollers are shown at 17 and 18. Rollers 17 engage spider 37, and rollers 18 engage an outer race 58 constituting an integral part of flywheel 14. Rollers 17 function in the same manner as pawls 52 of my co-pending application No. 397,794 filed June 12, 1941, and rollers 18 function in the same manner as pawls 57 of my said co-pending application. To achieve such functioning, the cage 37 and the flywheel member 58 are provided with conventional means—corresponding in their action to the bent springs "23" of Patent No. 1,997,-370 granted to H. J. Le Vesconte on April 9, 1935—to cause the rollers 17 and 18, respectively, to grip the respective adjacent flat sides of the respective ledges which project from either side of stationary member 41 (see Fig. 4 of my application No. 419,203) when urged in one rotational direction, while permitting free rolling action when the rollers are urged in the opposite rotational direction. Thus rotation of cage 37 will be possible in one direction only, and the same will be true of flywheel 14. Hence the operation is as follows: During flywheel acceleration, planetary spider 37 is held stationary (by engagement of rollers 17 with member 41) and therefore shaft 38 does not rotate; but after proper flywheel speed is achieved and the motor rotation is reversed (by operation of switch 50, to be described) the resulting reaction causes spider 37 to rotate (the rollers 17 overrunning) and spider 37 in turn causes shaft 38 and all parts driven thereby to rotate.

A two-way snap action switch 50 is incorporated in the motor grip and it is operated by push button 51. This switch is connected up to the battery cable 52 and also to the two solenoids 53 and 54 (see Fig. 3) which act upon the brush rigging. Each solenoid operates to move the brushes (55, 56 or 57, 58) into contact with commutator 63. The brush holders 81, 82 and 83, 84 (of "Bakelite" or equivalent) are hinged on pins 85 and 86 (see Figs. 4 and 5), pressed into an aluminum casting 87. The torsion springs 89, 90 act upon these brush holders to normally hold the brushes (55, 56, 57, 58) a slight distance away from the surface of the commutator 63, but upon energization of one of the two solenoids—say, 53—its plunger 91 (Fig. 6) moves pin 92 and plate 93 outwardly to swing brush holders 81 and 82 toward the commutator, thus engaging brushes 55 and 56, and sending current through the armature to rotate it in the predetermined direction. For opposite rotation, solenoid 54 is energized, whereupon brushes 57 and 58 engage the commutator and send current through the armature in the opposite direction. Of course, the solenoid 53 is de-energized before the solenoid 54 is energized; both solenoids being under the control of the single control switch 50. (See Fig. 3.)

In operation, output shaft 38 is connected up to the starter drive shaft in the airplane and the proper solenoid is energized by the pushing of button 51 forward, that is, toward the left. Current now flows through the armature and field windings in series, to rotate the motor in the flywheel accelerating direction. During this period, spider 37 remains stationary as does also output shaft 38 which is splined to it. After the flywheel has been brought up to normal speed (say, 30,000 R. P. M.) button 51 is released and then pushed toward the right to reverse the setting of switch 50, and thereby cause the motor to reverse its direction of rotation. As soon as the motor speed starts to decrease, output shaft 38 starts to rotate and drive the engaged parts (not shown) on the aircraft. The flywheel speed plus the motor speed add up to increase the rotational speed of output shaft 38 beyond that of the motor alone. Thus is produced a cranking action which is rotationally faster than could be produced by use of a direct-connected motor, or a geared-down motor, as in the prior art. After the energy stored in the flywheel has been completely expended, the cranking may nevertheless be continued (if the engine has not "started" in the meantime) by reason of the direct driving relationship that exists all the way from the motor shaft 26 to cranking shaft 38'. This direct drive may be maintained indefinitely, so long as the circuit to the motor remains closed at the switch 50.

When "starting" of the engine has been achieved, the switch 50 is returned to the middle ("off") position.

What is claimed is:

The method of operating an engine starter of the type having a high-speed, portable cranking member, a prime mover and an inertia member energizable in response to operation of said prime mover, which includes coupling the high-speed, portable cranking member to the engine prior to any rotation of the prime mover, then causing the motor to rotate to store energy in the inertia member, without transmitting any of said energy to the engine, thereafter causing said energy to be transmitted to the engine, and finally causing the delivery of energy from the prime mover to the high-speed, portable cranking member independently of the inertia member.

ROMEO M. NARDONE.